(12) United States Patent
Vishweshwara et al.

(10) Patent No.: US 8,051,399 B2
(45) Date of Patent: Nov. 1, 2011

(54) IC DESIGN FLOW INCORPORATING OPTIMAL ASSUMPTIONS OF POWER SUPPLY VOLTAGE DROPS AT CELLS WHEN PERFORMING TIMING ANALYSIS

(75) Inventors: Ramamurthy Vishweshwara, Bangalore (IN); Venkatraman Ramakrishnan, Bangalore (IN); Arvind Nembili Veeravalli, Bangalore (IN); H Udayakumar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 450 days.

(21) Appl. No.: 12/265,719

(22) Filed: Nov. 5, 2008

(65) Prior Publication Data

US 2009/0125858 A1 May 14, 2009

(30) Foreign Application Priority Data

Nov. 12, 2007 (IN) .......................... 2612/CHE/2007

(51) Int. Cl.
  *G06F 17/50* (2006.01)
(52) U.S. Cl. ......... 716/113; 716/108; 716/134; 716/136
(58) Field of Classification Search .................. 716/108, 716/111, 113, 134, 136
  See application file for complete search history.

(56) References Cited

U.S. PATENT DOCUMENTS

| | | | |
|---|---|---|---|
| 7,225,418 B2 * | 5/2007 | Shimazaki et al. | 716/113 |
| 7,464,359 B2 * | 12/2008 | Habitz et al. | 716/130 |
| 7,480,881 B2 * | 1/2009 | Tetelbaum et al. | 716/113 |
| 7,739,098 B2 * | 6/2010 | Kucukcakar et al. | 703/19 |
| 2004/0249588 A1 * | 12/2004 | Shimazaki et al. | 702/66 |
| 2005/0268264 A1 * | 12/2005 | Nagai | 716/6 |

OTHER PUBLICATIONS

"Shen Lin et al.,", "Full-Chip Vectorless Dynamic Power Integrity Analysis and Verification Against 100uV/100ps-Resolution Measuremen", "IEEE", Copyright Date: 2004, pp. 509-512.
"Mariagrazia Graziano et al.,", "Including Power Supply Variations Into Static Timing Analysis: Methodology and Flow", "IEEE", Copyright Date: 2005, pp. 229-232.
"Arvind NV et al.,", "Path Based Approach for Crosstalk Delay Analysis", "IEEE", Copyright Date: 2004, pp. 1-4.
"Sanjay Pant et al .,", "Static Timing Analysis Considering Power Supply Variations", "IEEE", Copyright Date: 2005, pp. 365-371.
"Dionysios Kouroussis et al.,", "Voltage-Aware Static Timing Analysis", "IEEE", Copyright Date: 2006, pp. 2156-2169.
"Korshak et al.," "An Effective Current Source Cell Model for VDSM Delay Calculation", "IEEE", Copyright Date: 2001, pp. 296-300.
Goyal et al., "Current Based Delay Models: A Must for Nanometer Timing", Downloaded Circa: Jan. 9, 2009, pp. 1-8.
"Effective Current Source Model (ECSM)", "Cadence Design Systems, Inc.", copyright Date: 2007, pp. 1-3.

* cited by examiner

*Primary Examiner* — Sun J Lin
(74) *Attorney, Agent, or Firm* — Robert D. Marshall, Jr.; W. James Brady; Frederick J. Telecky, Jr.

(57) ABSTRACT

An aspect of the present invention selects a maximum voltage and a minimum voltage in respective sub-intervals of a timing window in which an output of a cell is expected to switch, and performing timing analysis based on the selected maximum voltage and the selected minimum voltage. By using appropriate smaller sub-intervals within the timing window, more optimal physical layout of the design may be obtained. In an embodiment, the sub-intervals equal a cell delay, i.e., a delay between an input change to an output change for a corresponding cell. According to another aspect of the present invention, the sub-interval for later cells in a timing path are modified based on a modified timing window of previous cells in the timing path, to reduce the computational requirement.

7 Claims, 6 Drawing Sheets

IC DESIGN FLOW INCORPORATING OPTIMAL ASSUMPTIONS OF POWER SUPPLY VOLTAGE DROPS AT CELLS WHEN PERFORMING TIMING ANALYSIS

RELATED APPLICATION

The present application claims the benefit of co-pending India provisional application serial number: 2612/CHE/2007, entitled: "An Approach to Measure the Performance Impact of Dynamic Voltage Fluctuations Using Static Timing Analysis", filed on Nov. 12, 2007, naming Texas Instruments Inc. (the intended assignee) as the Applicant, and naming the same inventors as in the present application as inventors, and is incorporated in its entirety herewith.

BACKGROUND OF THE INVENTION

1. Technical Field

The present disclosure relates to integrated circuit (IC) design, and more specifically to an IC design flow which incorporates optimal assumptions of power supply voltage drops at cells contained in the IC, when performing timing analysis for the IC.

2. Related Art

An Integrated Circuit (IC) design flow generally refers to the various phases involved in designing an IC, with one or more of the phases being typically performed using electronic design automation (EDA) or computer aided design (CAD) tools. Some examples of the various phases (or steps) include functional description, synthesis, and timing analysis (timing closure), power supply drop (IR drop analysis), etc.

Power supply and ground connections to each component (cell) in the IC may be provided using one of several known approaches (for example via power supply and ground grids). As is well known in the relevant arts, the magnitude of the power supply provided to (i.e., available at) a cell may vary from desired (ideal) values due to voltage drops in the paths used to provide (or route) the power supply and ground connections to the cell.

Such power supply voltage drops generally cause the speed of operation (input signal received to output signal generation) of the cell to vary, with the speed variation generally having a positive correlation with the power supply voltage.

Such speed variations due to power supply drops may need to be taken into account when performing timing analysis for the IC. As is well known in the relevant arts, timing analysis generally refers to the process of verifying whether various timing parameters such as setup and hold timing, logic delay etc., at circuit nodes (e.g., inputs/outputs of cells) of the IC are satisfied or not for a desired operating speed (often indicated by the frequency of a clock(s) used to control the operation of various portions of the IC).

Hence, a measure of the magnitude of the voltage drops at each of the cells of the IC is often required when performing such timing analysis. Further, the voltage drops used in performing the timing analysis may need to be selected (or assumed) in an optimal manner such that optimum area and/or speed may be obtained for the IC, along with reduced design time, minimal computing and storage resources for the design flow, etc.

SUMMARY

An aspect of the present invention selects a maximum voltage and a minimum voltage in respective sub-intervals of a timing window in which the output of a cell is expected to switch, and performs timing analysis based on the selected values. By using appropriate smaller sub-intervals within the timing window, improved timing analysis and hence potentially more optimal physical layout of the design may be obtained. In an embodiment, the sub-intervals equal a cell delay, i.e., the delay between an input change to an output change for the corresponding cell.

According to another aspect of the present invention, the sub-intervals for later cells in a timing path are modified based on modified timing windows of previous cells in the path. Computational resource requirements may be reduced as a result.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Example Environment

Figure 1:
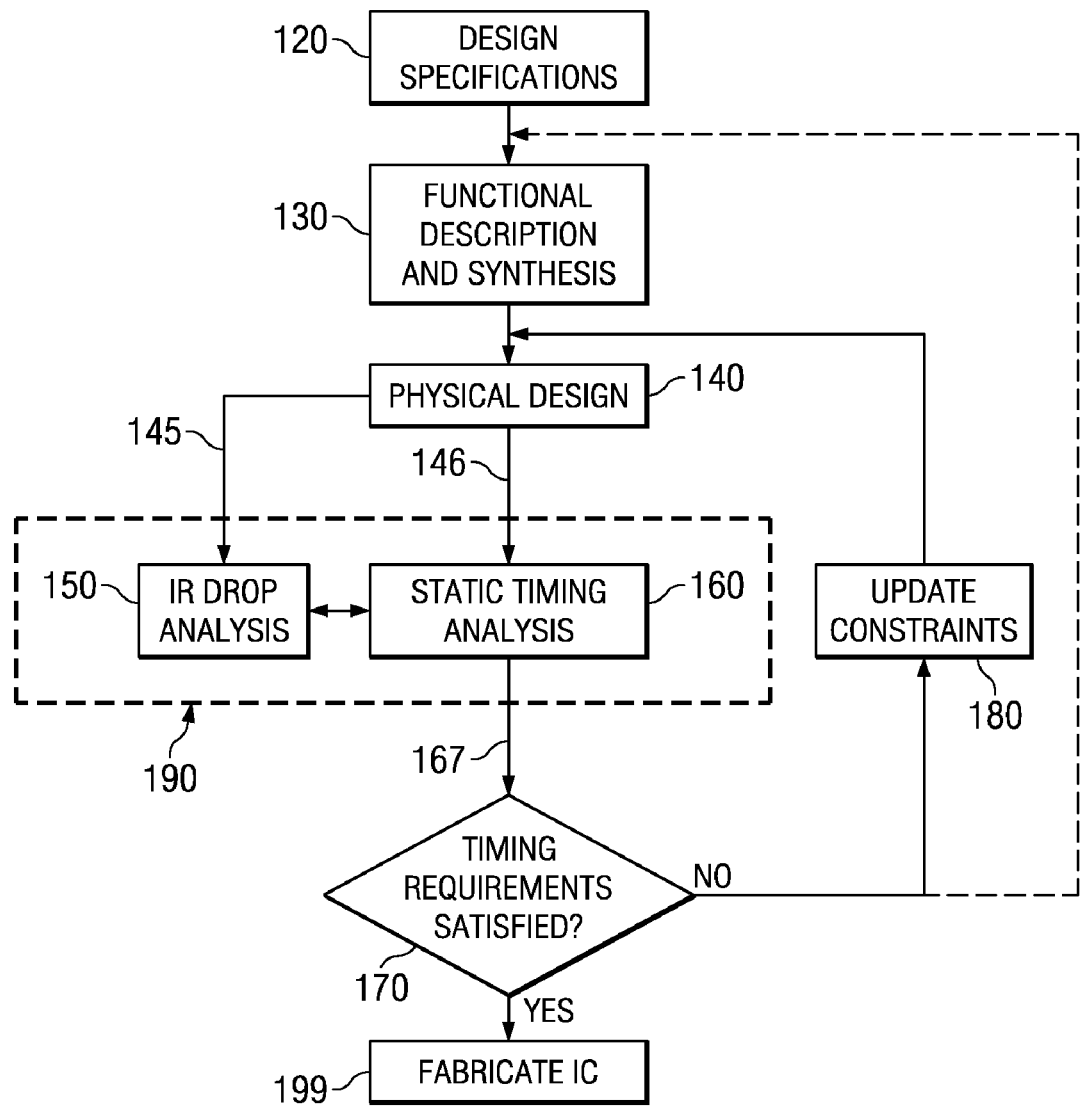
FIG. 1 is flow diagram illustrating an example design flow in designing an IC.

FIG. 1 illustrates an example design flow in designing an IC in which several features of the present invention can be implemented. The design flow is shown merely by way of illustration, and may include other/alternative phases (steps), and possibly other sequences of phases as well. The design may start with design specifications (120), in which the specifications of the IC may be established. A functional description followed by synthesis of the description into a circuit corresponding to the specifications (120) may then be performed in step 130. Functional description and synthesis (130) may generate a netlist (specifying interconnections between the various components/blocks in the design), as well as a library of the components contained in the design.

Physical design (140) may be performed next, and generally involves placement of components in the circuit, and routing the interconnection between the components. Power supply and ground connections may also be provided in the physical design (140) phase. Although not shown, but as is also well known in the relevant arts, constraints such as parameters of clock signals (duty cycle or clock period, clock skew, clock latency, input/output delay requirements of all ports relative to a clock transition etc.,) may be provided as inputs to physical design phase (140). Physical design (140) may generate as an output the physical layout of the components in the circuit, post-placement timing of various signals in the circuit, information regarding parasitic elements in the physical layout, etc. In some instances (based on the specific implementation of the physical design tool), the physical design step (140) may also provide post-placement timing information of the signals in the circuit.

As noted above, timing analysis may need to be performed taking into account the power supply drops at each component or cell in the IC. Hence a power supply (voltage or IR drop analysis 150) may be performed as a next step, based on the output (denoted by path 145) provided by physical design step (140). IR drop analysis (150) provides to STA 160 the power supply voltage (or a deviation from the desired voltage) for each cell in the IC. The power (IR) drop at each cell may be estimated by an IR drop analysis tool, several of which are commercially available.

Figure 2:
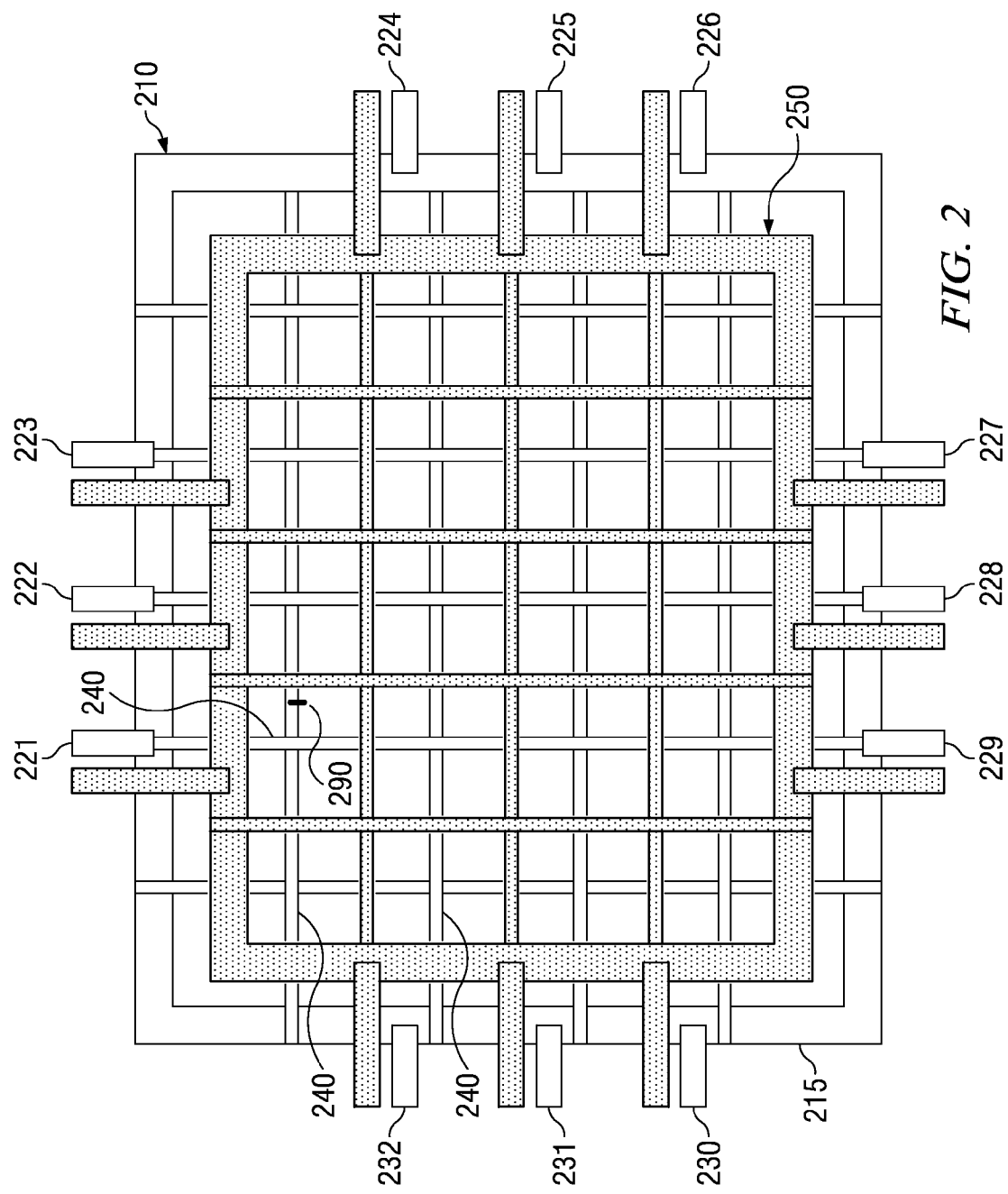
FIG. 2 depicts the details of an example power grid distribution network (PG network) used to illustrate various aspects of present invention.

FIG. 2 depicts the details of an example power grid distribution network (PG network) as may be generated as part of physical design (140). Power supply (Vdd) grid 210 provides a supply voltage Vdd to the cells of an IC such as gates, macro blocks, etc. Similarly, Vss grid 250 provides a reference ground voltage (0 volts) to the cells of the integrated circuit. Vdd grid 210 is shown containing core ring 215, I/O tap connections 221-232 and grid structure 240. I/O tap connections 221-232 may provide multiple paths/interfaces for receiving the supply voltage Vdd from an external power source/element. Core ring 215 represents a conducting material at the periphery of the integrated circuit.

Grid structure 240 represents the conducting paths providing connectivity to various cells of the IC. Grid structure 240 receives supply voltage Vdd from core ring 215 from the periphery of the integrated circuit. Grid structure 240 may contain various conducting metal straps (horizontal and vertical) implemented on a number of metal layers. Vss grid 250 may have a structure similar to Vdd grid 210. As is well known, during operation, the power supply (Vdd−Vss) provided to a cell may be different (smaller, as well as varying with respect to time) from the desired value of (Vdd−Vss). IR drop analysis 150 measures such power drop variations for each cell in the IC.

Continuing with FIG. 1, static timing analysis (160) (STA, referred to also simply as timing analysis) may be performed as a next step, in which the arrival times of the signals at various paths/nodes in the design are estimated, typically based on delay models (gate delays, connection-path or wire delays, etc., based on the output of the physical design step 140), as is well known. The corresponding timings at the various nodes may be checked against desired timing requirements (i.e., a comparison of arrival times against required times is made, whether set-up and hold times of clocked components/registers are acceptable, etc). In general, the circuit is optimized by measuring timing slacks (difference between arrival times and required times) at all nodes of the circuit as per the set of timing constraints, and changing the design to fix or improve all negative slacks (arrival time is later then required time).

Alternatively, one or more (partial or complete) iterations of STA 160 may be performed immediately after physical design 140, to provide to IR drop analysis 150 data enabling it to generate estimates of IR drop values, which may then be provided back to STA 160, and the timing analysis may be preformed again. STA 160 receives design information from physical design step 140 (as denoted by path 146). STA 160 and IR drop analysis 150 are in combination referred to as block 190.

If the desired timing requirements are met (step 170), based on the output/results (denoted by path 167) of STA 160, the output of the physical design process is sent for fabricating (199) the IC. If the timing requirements are not met, then physical design (140) may be performed again. Constraints values may be modified or updated (step 180) may also be updated if necessary. In some instances, functional design (130) may be modified, if necessary, and the following steps may be repeated till the timing requirements are met. Thus, the design flow procedure noted above may be iterative. Functional design (130), physical design (140) and static timing analysis (160) may be performed by an engineer/operator using corresponding EDA tools.

The voltage drop values (or alternatively the voltage values themselves) estimated or assumed by IR drop analysis 150 may impact the operation of STA 160. Specifically, the voltages that are selected may have a corresponding impact on both the design flow (in terms of time, resources, etc), and/or the implementation of the IC (in terms of, for example, area, maximum clock speed, etc). Thus, it may be desirable to select optimal values (or range of values) for the voltage drops in the design flow. Several features of the present invention provide such an optimal selection.

The features of the present invention are described in detail below with respect to example diagrams. First, however, various (technical) terms as may be needed for an understanding of the features of the present invention are noted with respect to an example circuit, such as might be contained in an IC, along with some prior approaches to the problem of optimum voltage (drop) selection.

2. Example Circuit

Figure 3A:
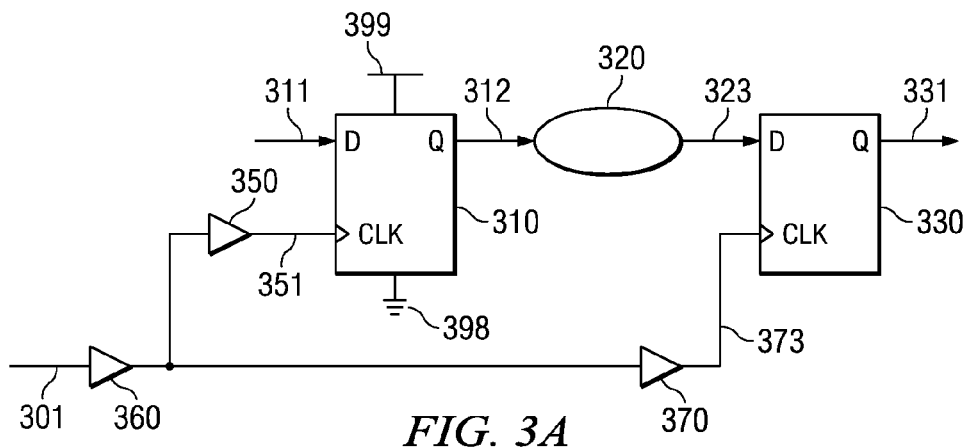
FIG. 3A is an example circuit used to illustrate several terms used in describing features of the present invention.

FIG. 3A is an example circuit used to illustrate several terms used in describing features of the present invention. The diagram is shown containing flip-flops (registers) 310 and 330, combinational logic 320, and buffers 350, 360 and 370. A clock signal received on path 301 is provided via buffers 360 and 350 to the clock terminal of flip-flop 310. Clock 301 is provided via buffers 360 and 370 to the clock terminal of flip-flop 330. Both of flip-flops 310 and 330 are assumed to be positive clock edge triggered, and transfer respective data inputs (D inputs 311 and 323) on corresponding output (Q) terminals 312 and 331 at the rising edge the clock signals at their respective clock inputs 351 and 373. Thus, data "launched" by flip-flop 310 at clock edge 351 is "captured" by flip-flop 330 at clock edge 373.

The relevant terms are next defined and illustrated with respect to FIG. 3A assuming that setup and hold timing analysis is desired to be performed with respect to capturing data at clocked element 330.

Launch Clock Path: A path traced by a clock from a (clock) source node to a launch register (register from which data is sent out). With respect to FIG. 3A, the launch clock path is the path from source node 301 to node 351, via buffers 360 and 350.

Capture Clock Path: A path traced by a clock from a (clock) source node to a capture register (which receives data). With respect to FIG. 3A, the capture clock path is the path from source node 301 to node 373, via buffers 360 and 370.

Data Path: A path traced by a data signal from a launch register to a capture register. With respect to FIG. 3A, the data path is the path from Q output 312 to D input 323 via combinational logic 320, and includes the clock-to-output delay of flip-flop 310.

Clock Common Path: A path that is common to both a launch and a capture clock path. With respect to FIG. 3A, the clock common path contains buffer 360.

Timing Window: A time interval between an earliest time instance and a latest time instance during which an output of a cell may (is expected to) change logic (transition). The upper bound of the timing window is the latest point of time at which the output of the cell can change with respect to a clock transition. Similarly, the lower bound of the timing window is the earliest point of time the output of a cell can toggle in response to a clock transition. Various commercially available STA tools provide timing windows for each cell in a design.

Vmin: The smallest value (magnitude) of power supply voltage (voltage across power supply and ground terminals of a cell) within a selected timing window (timing window as defined above).

Vmax: The largest value (magnitude) of power supply voltage (voltage across power supply and ground terminals of a cell) within a selected timing window (timing window as defined above).

Launch clock path and data path are together referred to as "launch path", and capture clock path is referred to as "capture path".

A timing path refers to either a launch path or a capture path.

Figure 3B:
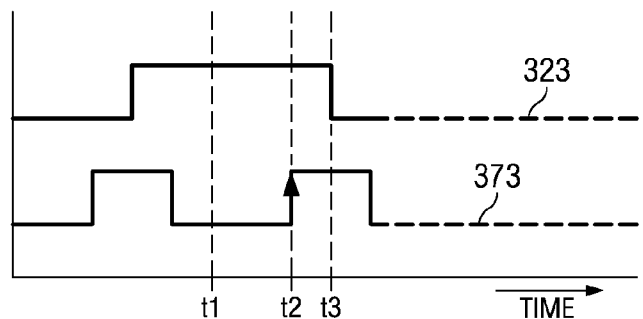
FIG. 3B is an example timing diagram used to illustrate setup and hold time requirements.

FIG. 3B is an example timing diagram used to illustrate setup and hold time requirements. Assuming rising edge of clock input 373 (provided to clock input of capture register 330) occurs at time instance t2, data input 323 provided to capture register 330 may need to be valid and stable (at logic high level in the example Figure of 3B) for at least a setup time duration prior to the rising edge, and indicated in FIG. 3B as the time interval t1 to t2. In addition, data input 323 may need to be valid and stable for at least a hold time duration after the rising edge of clock 373.

Paths containing cells that cause data 323 to be "launched" include the data path 312-logic 320-323, as well as launch clock path 360-350-351. Paths containing cells that cause data 323 to be "captured" (stored in flip-flop 330) include the capture clock path 360-370-373. Each cell in FIG. 3B is provided power via corresponding power supply (Vdd 399) and ground (Vss 398) connections, although only the corresponding connections for flip-flop 310 are shown in FIG. 3A. The power and ground connections may be provided via grids similar to 210 and 250 shown in FIG. 2, and the specific power supply voltages provided to a cell may vary with respect to time due to IR drops in the corresponding grids.

As is well known in the relevant arts, for setup timing analysis (as may be performed by STA 160, FIG. 1), the lowest value of power supply voltage (in a selected time interval of consideration) at cells in the launch clock path and data path may need to be considered (and the corresponding larger delays in the cells) since a lower power supply voltage causes a larger delay in such paths. For cells in the capture clock path, the largest value of power supply voltage (and the corresponding smaller delays in the cells) in the selected time interval need to be considered.

For hold timing analysis (as may also be performed by STA 160, FIG. 1), largest value of power supply voltage of cells in the launch clock path and data path, and lowest value power supply voltages of cells in the capture clock path may need to be considered. As an illustration, for the circuit of FIG. 3A, setup timing analysis may need to be performed based on smallest power supply voltage values (voltage 399 minus voltage 398) and the corresponding increased delays for cells 350, 360, 310 and 320, and largest power supply voltages (and corresponding smaller delays) for cells 360 and 370.

According to a prior approach, the power supply voltage magnitudes (voltage across power supply and ground terminals of a cell) for each cell for the entire duration of power grid analysis (IR drop analysis 150 of FIG. 1) are considered relevant for a subsequent timing analysis 160 (FIG. 1), and consequently Vmin and Vmax values for each cell are selected from a time interval equal to the entire duration noted above. However, such an approach may not be optimal and may result in large timing margins being assumed for STA.

Figure 4:
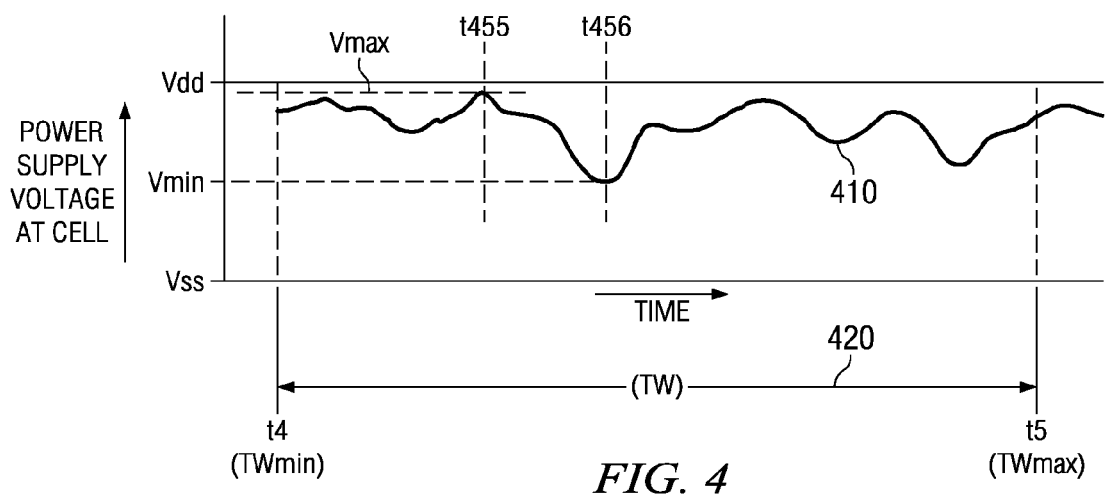
FIG. 4 is a diagram used to illustrate the manner in which voltage values in a timing window are selected, according to a prior approach.

According to another prior approach illustrated with respect to FIG. 4, respective Vmin and Vmax values for each cell are selected as the corresponding minimum and maximum power supply voltage values from a timing window (as defined above), instead of a (much longer) time interval noted above with respect to the first prior approach. In FIG. 4, voltage waveform 410 represents the instantaneous power supply voltage (Vdd–Vss) values for time instances in a timing window 420 corresponding to a cell. Time instance t4 represents the start (TWmin) of the timing window for the cell, while time instance t5 represents the end of the timing window (TWmax) for the same cell. Voltage Vmax (occurring at time instance t455) represents the maximum voltage for the cell in timing window (420), while voltage Vmin (occurring at time instance t456) represents the minimum voltage for the cell in the timing window.

For setup timing analysis, assuming the cell is located in a launch clock path or data path, Vmin is selected as the voltage (of interest) for which a corresponding time delay is computed for use in subsequent timing analysis. When the cell is located in a capture clock path, Vmax is selected as the voltage for which a corresponding time delay is computed for subsequent timing analysis. The selection of Vmin and Vmax is reversed, and corresponding time delays are computed for hold time analysis. It is noted here that such prior techniques may be implemented in some of the tools performing IR drop analysis 150 of FIG. 1.

One drawback with the voltage selection approach noted with respect to FIG. 4 is that the approach may still not provide optimal voltages for the cells. The sub-optimality may be large particularly for cells with wide timing windows, in scenarios where the input to the cell has a large fan-in, i.e., the input is provided as a logic combination (output) of the outputs of several other cells. The prior approaches to assuming voltage drop values for performing timing analysis may result in, for example, an IC to be designed (and fabricated)

with larger cells, resulting in more implementation area, a less efficient design flow in terms time and computing resources, in general, a sub-optimal design flow and implementation of an IC.

Several features of the present invention overcome one or more of the drawbacks noted above, and are described below.

3. Selecting Voltage Values Optimally

Figure 5:
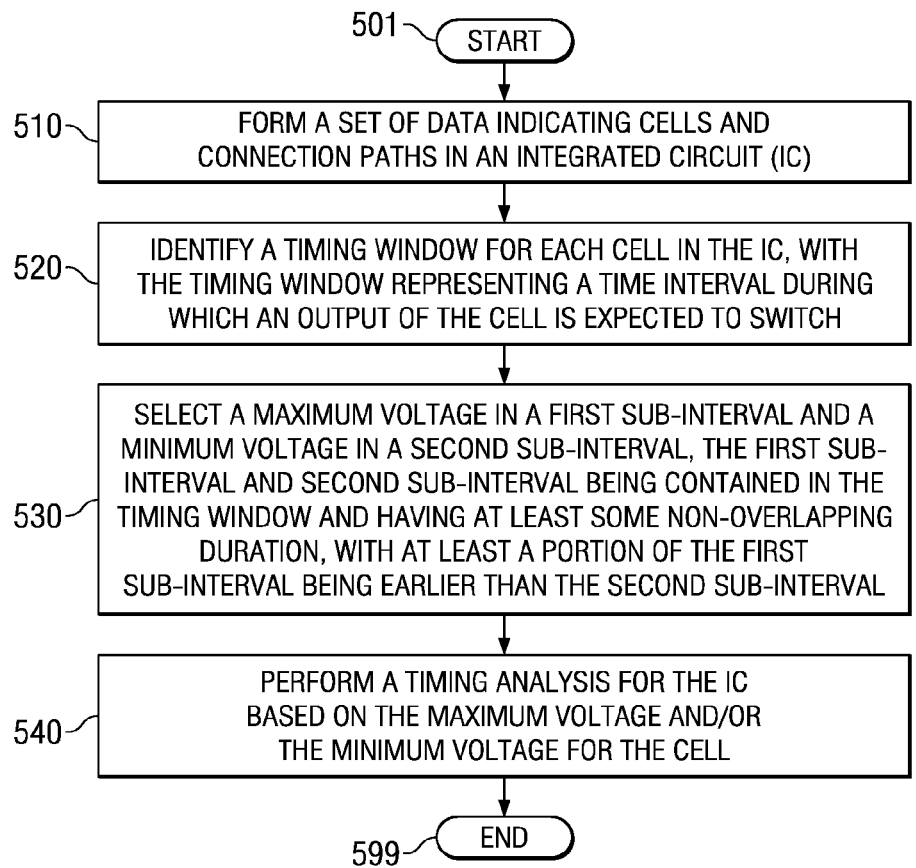
FIG. 5 is a flowchart illustrating the manner in which power supply voltage values at cells in an IC are selected for performing a corresponding timing analysis for an integrated circuit (IC), in an embodiment of the present invention.

FIG. 5 is a flowchart illustrating the manner in which power supply voltage values at each cell in an IC are selected for performing a corresponding timing analysis for an integrated circuit (IC) according to an aspect of the present invention. The flowchart is described with respect to FIG. 1, merely for illustration. However, various features can be implemented in other environments and other components. Furthermore, the steps are described in a specific sequence merely for illustration. Alternative embodiments in other environments, and using a different sequence of steps, can also be implemented without departing from the scope and spirit of several aspects of the present invention, as will be apparent to one skilled in the relevant arts by reading the disclosure provided herein. The flowchart starts in step 501, in which control passes immediately to step 510.

In step 510, a set of data is formed, with the data indicating cells and connection paths in an IC. The set of data may be formed, for example, by a physical design (place and route) tool and thus indicates the physical location/placement of the cells and the connection paths. Control then passes to step 520.

In step 520, a timing window is identified for each cell in the IC, with the timing window representing a time interval during which an output of the cell is expected to switch. Switching generally means that the output of a cell takes on a logic value in response to a corresponding change in input(s) provided to the cell. The timing window at which switching is expected to occur may be based on one or more clock signals. Identification of the timing windows for each cell may be performed, for example, by a tool performing STA 160 (FIG. 1). Control then passes to step 530.

In step 530, a maximum voltage in a first sub-interval, and a minimum voltage in a second sub-interval are selected from the timing window. The first sub-interval and second sub-interval have at least some non-overlapping duration, with at least some portion of the first sub-interval being earlier in time than the second sub-interval. The maximum voltage represents a maximum value of voltage available at the cell in the first sub-interval, and the minimum voltage represents a minimum value of voltage available at the (same) cell in the second sub-interval.

For example, assuming that power supply connection to cell 310 is provided at power supply point 290 of power grid 210 of FIG. 2, the voltage at point 290 may vary during operation. Thus, the maximum voltage in the first sub-interval and the minimum voltage in the second sub-interval (respective voltages at point 290 with respect to ground/grid 250) are selected for cell 310.

In step 540, a timing analysis for the IC is performed based on the maximum voltage and the minimum voltage for the cell. Control then passes to step 599, in which the flowchart ends. Operations corresponding to the steps above may be performed by software, as described with respect to an embodiment below. Further, the steps above may be repeated till an optimum value of Vmax and Vmin are obtained, as described in sections below.

It may be appreciated from the description above that the maximum and minimum voltages are selected from sub-intervals contained in a timing window (for each cell), rather than from the entire length of the timing window. The features described above are further illustrated next with respect to example diagrams.

4. Selection of Sub-intervals

Figure 6:
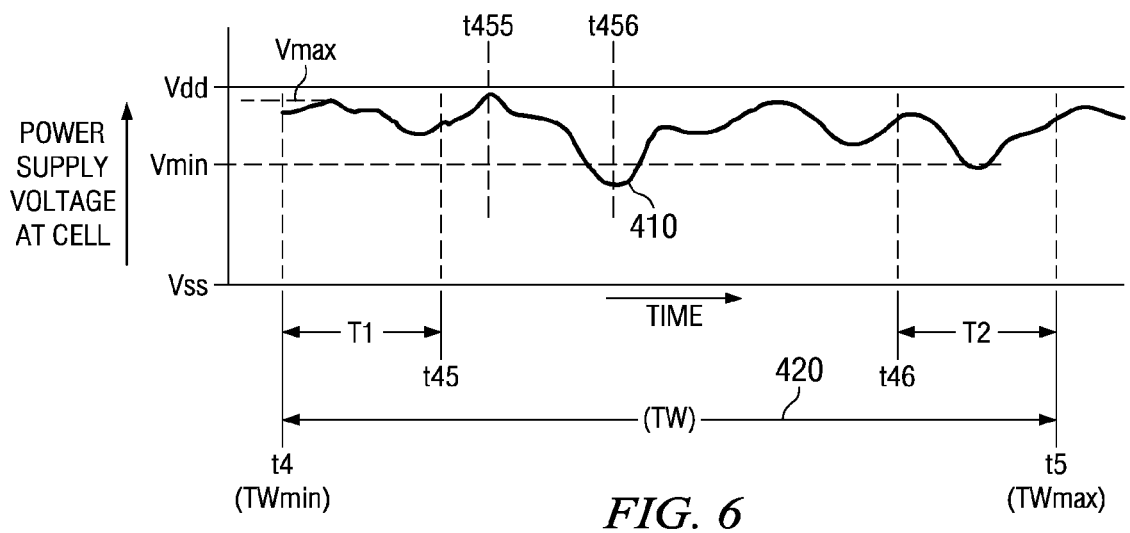
FIG. 6 is a diagram used to illustrate the manner in which voltage values in a timing window are selected, in an embodiment of the present invention.

FIG. 6 is a diagram used to illustrate the manner in which voltage values in a timing window are selected, in an embodiment of the present invention. For ease of description the same voltage waveform (410) as in FIG. 4 is reproduced in FIG. 6, with time instances t4 and t5 being the start and end time instances of the timing window. As noted above, sub-intervals T1 (t4 to t45) and T2 (t46-t5) are selected, and timing analysis (STA) is performed based on the maximum voltage (Vmax in FIG. 6) in T1 and the minimum voltage (Vmin in FIG. 6) in T2. In contrast, the prior approach illustrated with respect to FIG. 4 selects the maximum and minimum voltages (occurring respectively at t455 and t456) from the entire length of the timing window.

For setup timing analysis, output transitions of cells located in the corresponding launch path occurring at end time instance t5 (TWmax) of the corresponding cell's timing window may be most constraining. Output transitions of cells located in the corresponding capture path occurring at start time instance t4 (TWmin) of the corresponding cell's timing window may be most constraining. The most constraining considerations for hold timing analysis are the converse of those for a setup timing analysis.

In an embodiment of the present invention, sub-intervals T1 and T2 with lengths each equal to one cell delay duration of the cell are selected, and Vmin and Vmax values are selected from the sub-intervals, as noted above. The corresponding selected voltages are annotated on the cells, and static timing analysis (STA) is performed. Annotation generally involves setting (or modifying) one or more attributes (properties) of the cell (for example, in a corresponding data structure describing the cell) with the selected voltage values. Delay calculation (during STA) for the cell may then use the attributes (selected voltages) for estimating the delay for the cell. In performing STA, cell output delay values may be computed based on the selected maximum or minimum voltage values (depending on the location (capture or launch path) of the cell) and the type of timing analysis to be performed (setup or hold).

Such an approach is more optimal (than considering the entire timing window for selection of maximum and minimum voltages) since a power supply voltage to a cell lower than the selected Vmin, at a time instance earlier than t46 (one cell delay prior to end of the timing window), cannot cause a delay degradation of the cell greater than one-cell delay duration (100%). Similarly, a power supply voltage to a cell greater than the selected Vmax, at a time instance later than t45 (one cell delay from the start of the timing window), cannot cause a delay improvement of the cell greater than one-cell delay duration (100%). It is noted here that delay degradation of a cell may not be greater than 100% due to voltage considerations alone, and in typical implementation scenarios, delays due to voltage effects (power supply drops) rarely cause more than 10%-15% degradation in timing.

It may therefore be appreciated that it may be necessary to select only sub-intervals aligned to the start and end instances of a timing window (as shown in FIG. 6), and select voltages in the sub-intervals rather than the entire timing window.

It is noted that the above operation (extraction of maximum and minimum voltages from sub-intervals of the corresponding timing window) is performed for each cell in the IC to enable performing the STA. It is also noted that the timing window noted above corresponds to the timing window at the output pin/node of each cell. Further, only for the capture flop, the minimum voltage in the timing window corresponding to the clock pin needs to be used so as to account for the worst setup time possible. It is noted that while (ideally) delay in the capture flop may not be required to be considered (a capture flop being the "endpoint" for the corresponding launch and capture paths), setup and hold time requirements may still be dependent on the capture flop. Hence, the assumption that a capture flop operates at the Vmin voltage may be made (as a conservative design principle) to ensure that a higher (worst case) setup time is met.

The selection of voltage values as described above may render the IC design flow more optimal in terms of time, computing resources, etc., and a more optimal implementation of the IC. The description is continued with the description of a modified design flow diagram incorporating the features described above, in an embodiment of the present invention.

5. Improved IC Design Flow

Figure 7:
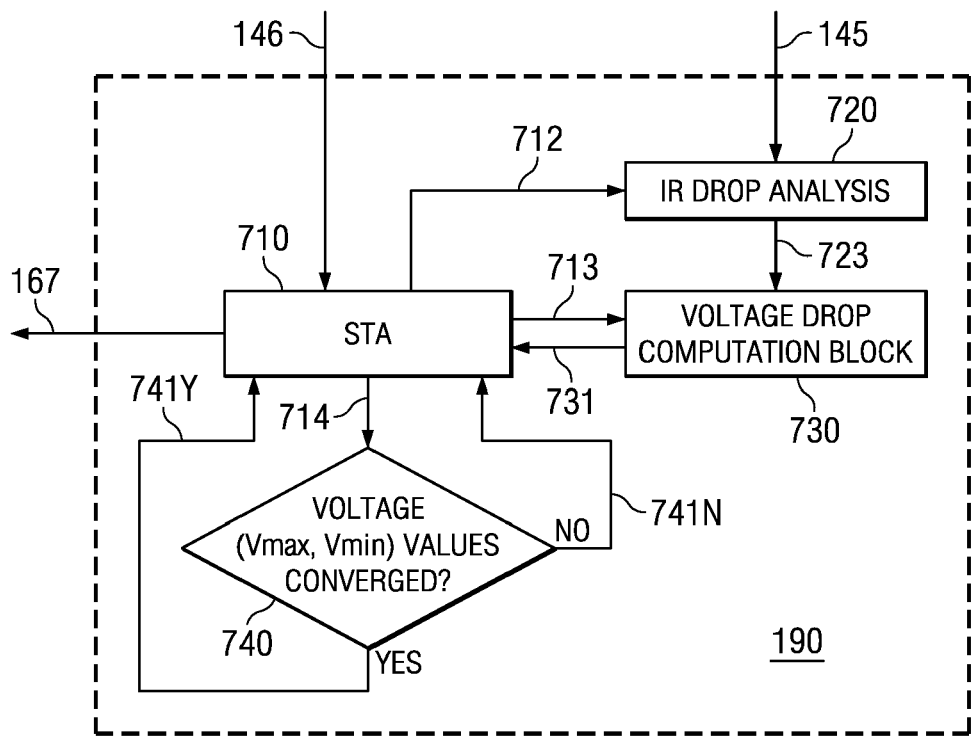
FIG. 7 is a diagram of a portion of an IC design flow incorporating several features of the present invention in an embodiment.

FIG. 7 is a diagram of a portion of a typical IC design flow incorporating several features of the present invention in an embodiment. It is assumed in the description below that design flow portion 190 of FIG. 7 replaces block 190 of FIG. 1, and that the rest of the blocks of FIG. 1 are contained in an IC design flow incorporating several features of the present invention.

STA 710 receives design information (indicated by path 146, and as noted above with respect to FIG. 1) of the cells in the design, their interconnections, placement, etc. Based on the received information (set of data), STA 710 identifies timing windows (TW) for each cell in the design based on a nominal value of power supply for each cell. The nominal value equals the ideal power supply value (Vdd minus Vss, of FIG. 6). STA 710 provides the timing windows to IR drop analysis 720 via path 712. Based on the design information (including power and ground grid information) received via path 145, IR drop analysis 720 estimates power supply waveforms for the duration of the timing window of each cell, and forwards the waveforms to voltage drop computation block 730 (via path 723).

Each waveform may be represented as a sequence of digital values representing sampled voltage magnitudes at the corresponding cell, with the sampling intervals chosen to be sufficiently shorter when compared to the clock period of a corresponding clock signal. As an example, assuming the IR drop analysis is performed for a duration of 20 ns (nanoseconds), the voltages may be sampled at 10 ps (picoseconds) intervals, thus providing 2000 data points (voltages and corresponding time intervals).

Voltage drop computation block 730 computes Vmax and Vmin voltage values in sub-intervals of the corresponding timing windows of each cell in a manner described above. In the illustrative example of above, assuming the cell delay corresponds to 20 samples (200 ps), such 20 samples from the beginning may be examined to select Vmax, and similarly the last 20 samples may be examined to select Vmin. Voltage drop computation block 730 provides the selected Vmax and Vmin values for each cell to STA 710, as denoted by path 731. STA 710 then performs a static timing analysis for the IC, based on the Vmax and Vmin values received for each cell.

It may be appreciated that a timing analysis performed with the Vmax and Vmin values (rather than the nominal power supply value) may produce modified timing windows (changed timing window lengths) for one or more cells in the IC. Therefore, STA 710 forwards the modified timing window values back to voltage drop computation block 730 (as denoted by path 713).

Voltage drop computation block 730 then recomputes maximum and minimum voltage values (Vmax and Vmin) based on the modified timing windows, and provides new Vmax and Vmin values back to STA 710 (on path 731). After receiving recomputed values of Vmax and Vmin from voltage drop computation block 730, STA 710 may determine whether the voltage (Vmax and Vmin) values for each cell have converged to a final value (denoted by path 714, and decision block 740 in FIG. 7).

Alternatively, the decision whether convergence is reached or not may be taken by another block (for example, within block voltage drop computation block 730 itself) instead of by STA 710. In an embodiment of the present invention, voltage drop computation block 730 stores the voltages computed in a previous iteration, compares these with the voltages for a present iteration, and checks for convergence. Convergence is deemed to be achieved when the changes to Vmax and Vmin are below a desired threshold in successive iterations of FIG. 7, as described below with examples.

If the voltage values are deemed not to have converged (as denoted by path 714N), STA performs another timing analysis, and the operations of STA 710 and voltage drop computation block 730 as denoted by loop 713-731-713 may be repeated again. Thus, the operations denoted by blocks 710, 730 and 740 may be repeated, till it is deemed that the voltage values have converged (as denoted by path 741Y). STA 710 then provides the output of the timing analysis on path 167, and the corresponding operation of the design flow of FIG. 1 may be performed as noted above with respect to FIG. 1.

In an embodiment of the present invention, the criterion for convergence is based on whether or not STA 710 computes a negative timing delta during the iterative operations of STA 710 and voltage drop computation block 730. A negative timing delta generally implies that a corresponding timing requirement (setup or hold timing) is not satisfied, and thus convergence is deemed not to have occurred. On the other hand, if all timing deltas computed by STA 710 are zero, then the timing windows considered for identifying voltages Vmax and Vmin may not change further and the iterations are deemed to have converged.

However, if the timing deltas at the end of an iteration are positive, the immediately prior iteration is deemed to be the point of convergence. Thus, the iteration starting from which voltage values Vmax and Vmin do not further change substantially (zero change or change bounded within a predetermined range) is deemed to be the point of convergence.

In the flow of FIG. 7, the IR drop analysis step 720 operates only once (at the beginning of the flow of FIG. 7), and further operations are performed iteratively by blocks STA 710 and voltage drop computation block 730. In another embodiment of the present invention, IR drop analysis 720 is also included in the iterative loop noted above, and is described next with respect to FIG. 8.

Figure 8:
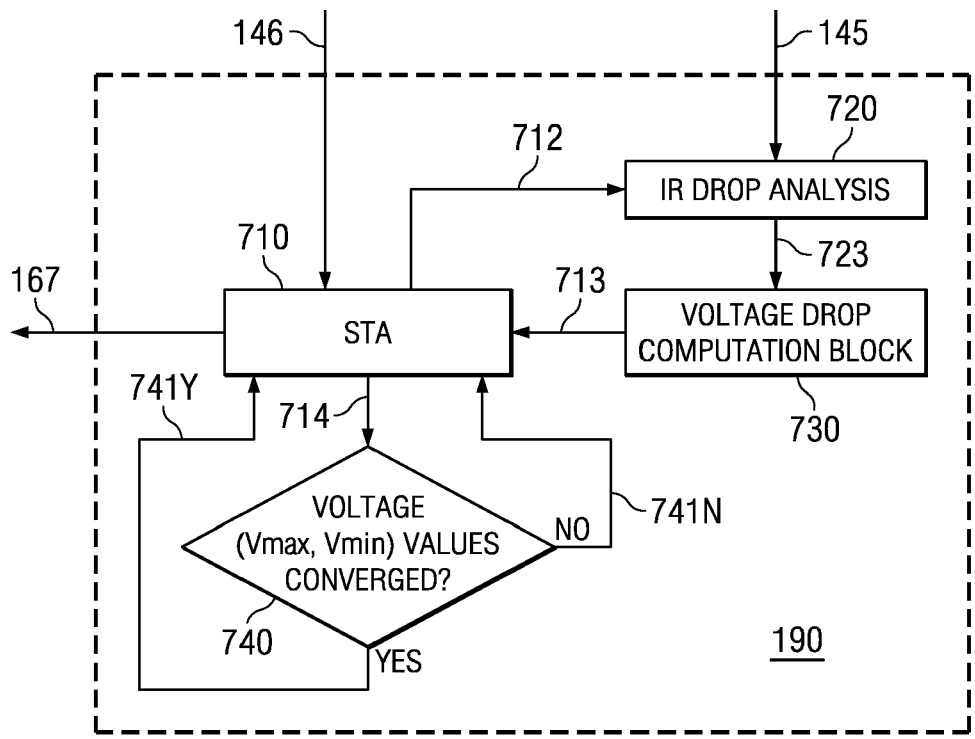
FIG. 8 is a diagram of a portion of an IC design flow incorporating several features of the present invention in an alternative embodiment.

The operation of the flow of FIG. 8 is similar to that of FIG. 7, except for the following differences. STA 710 provides corresponding to each cell the initial timing windows (computed based on the nominal power supply voltage) to IR drop analysis 720 via path 712. IR drop analysis 720 provides (path 723) the voltage waveforms within the timing windows to voltage drop computation block 730. Voltage drop computation block 730 provides the Vmax and Vmin values computed in sub-intervals of the corresponding timing windows to STA 710. STA 710 recomputes timing windows (modified timing windows), and provides the timing windows to IR drop analysis 720. In contrast, in the flow of FIG. 7, such provision of the modified timing windows is provided by STA 710 to voltage drop computation block 730.

IR drop analysis 720 recomputes voltage waveforms (representing voltage levels at respective time instances) corresponding to the modified timing windows, and provides the modified voltage waveforms to voltage drop computation block 730.

The operations performed by the loop (STA 710-IR drop analysis 720-voltage drop computation block 730-STA 710) are repeated iteratively till convergence is deemed to have occurred. The criteria for convergence may be similar to those noted above with respect to FIG. 7.

An IC design flow incorporating sub-phase 190 as illustrated above with respect to FIGS. 7 and 8 enable timing analysis to be performed using optimum values of power supply voltage values for cells in the IC, and provide good accuracy of results, thereby providing the benefits of the features of the present invention as noted above.

However, the iterative process involved in the flows of FIGS. 7 and 8 may require long computation times. In an alternative embodiment of the present invention, the sub-intervals used for selecting voltage values are modified to enable quicker convergence (fewer iterations of the loops noted above with respect to FIGS. 7 and 8) or avoiding iterations altogether, and is described next.

Figure 9:
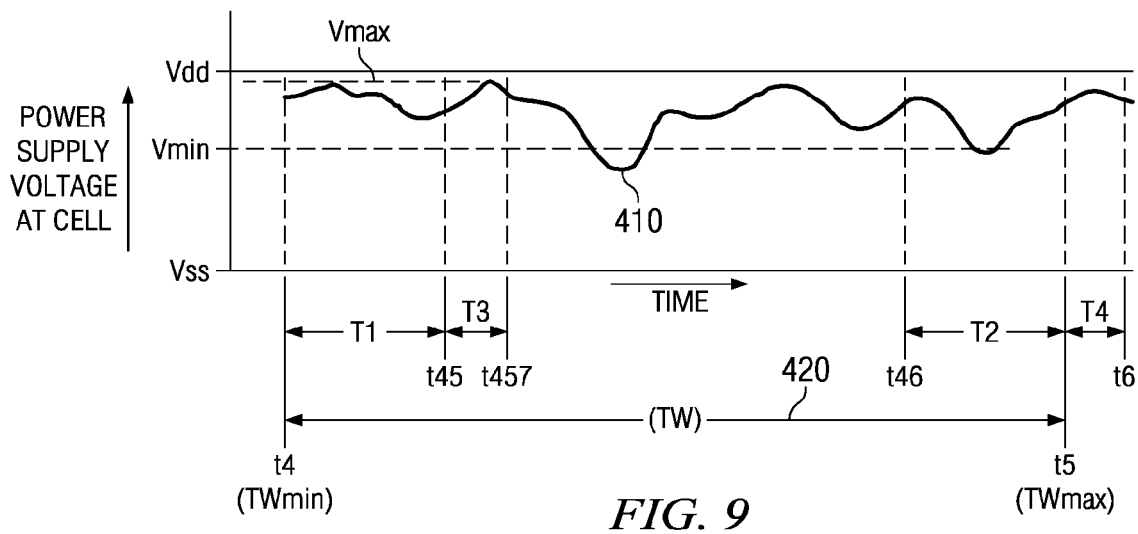
FIG. 9 is a diagram illustrating the manner in which modified sub-intervals in a timing window are used to select voltage values, in another embodiment of the present invention

6. Modifying Selection of Sub-Intervals in a Timing Window for Quicker Convergence FIG. 9 is a diagram illustrating the manner in which modified sub-intervals in a timing window are used to select voltage values, in another embodiment of the present invention. For ease of description, the same voltage waveform (410) as in FIG. 6 is reproduced in FIG. 9, with time instances t4, t5, t45 and t46 having identical meanings as in FIG. 6.

With respect to FIG. 9, augmented length sub-intervals are used to select maximum and minimum voltages for a cell, with the augmentation in lengths of the sub-intervals for a particular cell being chosen to account for the cumulative shift in timing windows (due to modified delays) of cells preceding the cell in a corresponding path (launch or capture) in the specific circuit portion of the IC for which timing analysis is to be performed. In FIG. 9, time intervals T3 (t45 to t457) and T4 (t5 to t6) represent durations by which the respective sub-intervals (T1 and T2 used in FIG. 6) are augmented. Thus, the modified time intervals used for selecting maximum voltage and minimum voltage for a cell are the respective intervals (t4 to t457) and (t46 to t6).

To illustrate with an example, assuming Vmax and Vmin have been computed using the technique of FIG. 6 for buffer 360 (FIG. 3A), STA 710 may recompute a modified timing window for buffer 360 due to the selection of new values Vmax and Vmin, rather than the nominal voltage Vdd for buffer 360. Therefore, when processing for the next cell (buffer 350) in the same path (launch path in this example), the sub-intervals which would otherwise have been used for selecting Vmax and Vmin values for buffer 350 are augmented to account for the modified timing window computed for buffer 360.

Thus, in the embodiment, cells in a path are processed sequentially, with timing windows and corresponding sub-intervals being selected for the first cell in the path (in the order of signal propagation). Any change in timing window of the cell is reflected in the processing of a next cell in the path, by augmenting the sub-intervals of such a next cell by durations to account for the modified timing window of the first (previous) cell.

In the embodiment, for the '$n^{th}$' cell of a path, the Vmin and Vmax voltages are computed as described below:

$$V\text{min}(n) = \text{minimum voltage in the timing interval } T2 \text{ plus } T4 \qquad \text{Equation 1}$$

wherein, $$T2 = TW\text{max}(n) - Td(n)$$

$$T4 = T\text{shift-cumulative}(n)$$

$$V\text{max}(n) = \text{maximum voltage in the timing interval } T1 \text{ plus } T3 \qquad \text{Equation 2}$$

wherein, $$T1 = TW\text{min}(n) + Td(n)$$

$$T3 = T\text{shift-cumulative}(n)$$

Terms TWmax(n), TWmin(n), Td(n) and Tshift-cumulative(n) used in equations 1 and 2 are defined below:

TWmax(n)=end time instance of the timing window of the nth cell of the path after a first iteration of STA to obtain timing windows for all cells in the IC.

TWmin(n)=start time instance of the timing window of the nth cell of the path after a first iteration of STA to obtain timing windows for all cells in the IC.

Td(n)=Delay of the nth cell at the nominal voltage (Vdd).

Tshift-cumulative(n)=The cumulative shift in the timing window at the $n^{th}$ cell due to voltage degradation along the timing path (leading up to the cell).

Tshift-cumulative(n) is in turn computed using the following equations:

$$T\text{shift-cumulative}(n) = T\text{shift-cumulative}(n-1) + Vtd*\Delta V(n-1) \qquad \text{Equation 3}$$

$$T\text{shift-cumulative}(0) = 0 \qquad \text{Equation 4}$$

wherein,

Vtd=scaling factor representing a ratio of a change in signal delay for a corresponding change in supply voltage (delay delta to voltage delta ratio). Vtd represents the maximum cell delay delta possible for a given voltage delta, and is constant for a (manufacturing) technology and a given operating voltage, $\Delta V(n) = (V\text{nominal} - V\text{min})/V\text{nominal}$, Vnominal being the nominal power supply voltage (Vdd in the description above). $\Delta V(n)$ is thus the normalized voltage delta (change) for the nth cell. Vmin is as defined in sections above.

"*" represents a 'multiply' operation.

Flow diagrams of FIGS. 7 and 8, when used in conjunction with the modified sub-interval selection technique noted above, may require only a single iteration of the corresponding loops, i.e., with Vmin and Vmax being selected from the modified sub-intervals as described above, voltage-drop induced timing degradation may be computed directly in a single iteration. Iterative analysis as noted with respect to FIGS. 7 and 8 may be avoided entirely (or at least minimized). The scale factor (Vtd) used for delay degradation estimation may be computed by a preliminary design independent library analysis, and one of several well known techniques can be used to compute the scale factor.

The techniques noted above are described based on the assumption of a circuit operation using a single clock (clock phase or frequency), and that each cell in the circuit is therefore associated with a timing window corresponding to the single clock. However, several features described above can be extended to scenarios when a circuit portion (such as the circuit shown in FIG. 3A) may operate using different clock frequencies/phases (multiple operational/functional modes), and/or when the output of a cell is provided to multiple following cells, with at least some of such following cells associated with different paths (different launch or capture paths).

For example, Q output 312 of FIG. 3A may be provided as input to one or more other capture registers in addition to register 330, and the other capture registers may operate with respect to clock signals of a different phase/frequency as compared to clock 301. As another example, the circuit of 3A may be operated using different clock frequencies/phases in different operational/functional modes of the IC using the circuit.

In such scenarios, the operations noted above may be performed separately for each of the multiple operational modes or multiple paths. Alternatively, a single analysis (similar to the case described above in which a cell is associated/operated always with only a single clock signal frequency, and/or is in a single path) may be performed simultaneously as well.

In such an alternative approach all possible timing windows (with each timing window corresponding to a corresponding clock phase/frequency of operation, or one of multiple paths under consideration) at the output of every cell are processed. (The timing windows for a single cell may be of different durations depending on the specific clock frequency or circuit and path structure).

From the multiple timing windows for each cell, the technique described above with respect to FIG. 9 (in which modified sub-intervals are used to account for cumulative delays in cells located earlier in the path) is performed to compute the minimum and maximum voltages for each of the multiple timing windows. From the multiple minimum (Vmin) and maximum (Vmax) voltages corresponding to each of the multiple timing windows, the least of the multiple minimum voltages, and the largest of the multiple maximum voltages are then used as the "final Vmin", and "final Vmax" for timing analysis.

Thus several features of the present invention provide an IC design flow that incorporates optimal assumptions of power supply voltage drops at cells when performing timing analysis, thereby rendering the flow efficient, and the design of the IC more optimal.

Voltage drop computation block 730 and decision block 740 may be implemented using software, hardware, or a combination of hardware and software. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware).

Cost and performance can be balanced by employing a mix of hardware, software and/or firmware. In an embodiment of the present invention, the operation of voltage drop computation block 730 and decision block 740 is implemented as software instructions written using PERL script. Accordingly, an example embodiment implemented substantially in software is described next.

7. Digital Processing System

Figure 10:
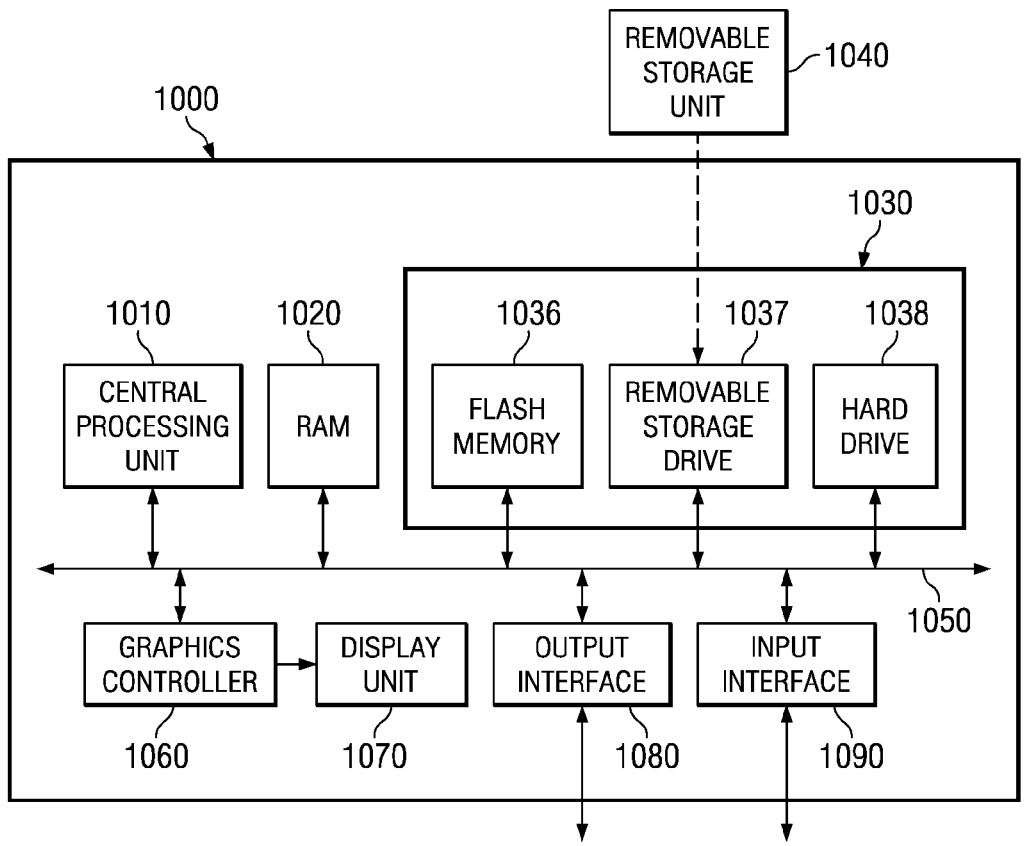
FIG. 10 is a block diagram illustrating the details of a system in which several aspects of the present invention are operative by execution of appropriate software instructions.

FIG. 10 is a block diagram illustrating the details of digital processing system 1000 in which several aspects of the present invention are operative by execution of appropriate software instructions. Though shown as a stand alone system, digital processing system may be implemented as a distributed system containing multiple individual systems operating cooperatively. Digital processing system 1000 may be used to implement various phases of the EDA/CAD based design phases, including voltage drop computation block 730 and decision block 740, described above.

Digital processing system 1000 may contain one or more processors such as a central processing unit (CPU) 1010, random access memory (RAM) 1020, secondary memory 1030, graphics controller 1060, display unit 1070, output interface 1080 and input interface 1090. All the components may communicate with each other over communication path 1050, which may contain several buses as is well known in the relevant arts.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general-purpose processing unit. RAM 1020 may receive instructions from secondary memory 1030 using communication path 1050.

Input interface 1090 may correspond to a keyboard and a pointing device (e.g., touch-pad, mouse) and may be used to provide inputs (e.g., user requests to perform an operation on a remote system). Output interface 1080 provides connectivity to devices external to system 1000, and may be used to communicate with other connected systems (not shown). Output interface 1080 may include a network interface.

Secondary memory 1030 may contain hard drive 1035, flash memory 1036, and removable storage drive 1037. Secondary memory 1030 may store the data (e.g., design information of an IC, timing window information, various input/output data of design phases noted above, etc,) and software instructions (e.g., PERL scripts noted above), which enable digital processing system 1000 to provide several features in accordance with the present invention.

Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, or removable, etc.).

In this document, the term "computer program product" is used to generally refer to removable storage unit 1040 or hard disk installed in hard drive 1038. These computer program products are means for providing software to digital processing system 1000. CPU 1010 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A non-transitory computer readable medium carrying one or more sequences of instructions for causing a digital processing system to facilitate designing of an integrated circuit, wherein execution of said one or more sequences of instructions by one or more processors contained in said digital processing system for designing said integrated circuit causes said digital processing system to perform the actions of:

forming a set of data indicating cells and connection paths in said integrated circuit:

identifying a timing window for each cell in said integrated circuit, with said timing window representing a time interval during which an output of the cell is expected to switch:

selecting a maximum voltage in a first sub-interval and a minimum voltage in a second sub-interval, wherein at least a portion of said first sub-interval is earlier than said second sub-interval, said first sub-interval and said second sub-interval are contained in said timing window and have at least some non-overlapping duration, wherein said maximum voltage represents a maximum value of power supply voltage provided at said cell in said first sub-interval, and said minimum voltage represents a minimum value of power supply voltage provided at said cell in said second sub-interval; and performing a timing analysis for said integrated circuit based on said maximum voltage and said minimum voltage for said cell;

wherein an end time instance of said second sub-interval coincides with an end time instance of said timing window, wherein a start time instance of said first sub-interval coincides with a start time instance of said timing window;

wherein said cell is in a launch path of a clocked element, said timing analysis is designed to perform setup timing analysis using said minimum voltage and to perform hold timing analysis using said maximum voltage.

2. A non-transitory computer readable medium carrying one or more sequences of instructions for causing a digital processing system to facilitate designing of an integrated circuit, wherein execution of said one or more sequences of instructions by one or more processors contained in said digital processing system for designing said integrated circuit causes said digital processing system to perform the actions of:

forming a set of data indicating cells and connection paths in said integrated circuit;

identifying a timing window for each cell in said integrated circuit, with said timing window representing a time interval during which an output of the cell is expected to switch:

selecting a maximum voltage in a first sub-interval and a minimum voltage in a second sub-interval, wherein at least a portion of said first sub-interval is earlier than said second sub- interval, said first sub-interval and said second sub-interval are contained in said timing window and have at least some non-overlapping duration, wherein said maximum voltage represents a maximum value of power supply voltage provided at said cell in said first sub-interval, and said minimum voltage represents a minimum value of power supply voltage provided at said cell in said second sub-interval; and performing a timing analysis for said integrated circuit based on said maximum voltage and said minimum voltage for said cell;

wherein an end time instance of said second sub-interval coincides with an end time instance of said timing window, wherein a start time instance of said first sub-interval coincides with a start time instance of said timing window;

wherein said cell is in a capture path of a clocked element, said timing analysis is designed to perform setup timing analysis using said maximum voltage and said hold timing analysis using said minimum voltage.

3. A non-transitory computer readable medium carrying one or more sequences of instructions for causing a digital processing system to facilitate designing of an integrated circuit, wherein execution of said one or more sequences of instructions by one or more processors contained in said digital processing system for designing said integrated circuit causes said digital processing system to perform the actions of:
- forming a set of data indicating cells and connection paths in said integrated circuit;
- identifying a timing window for each cell in said integrated circuit, with said timing window representing a time interval during which an output of the cell is expected to switch;
- selecting a maximum voltage in a first sub-interval and a minimum voltage in a second sub-interval,
- wherein at least a portion of said first sub-interval is earlier than said second sub-interval, said first sub-interval and said second sub-interval are contained in said timing window and have at least some non-overlapping duration,
- wherein said maximum voltage represents a maximum value of power supply voltage provided at said cell in said first sub-interval, and said minimum voltage represents a minimum value of power supply voltage provided at said cell in said second sub-interval; and
- performing a timing analysis for said integrated circuit based on said maximum voltage and said minimum voltage for said cell;
- wherein an end time instance of said second sub-interval coincides with an end time instance of said timing window,
- wherein a start time instance of said first sub-interval coincides with a start time instance of said timing window;
- wherein said identifying is performed after said timing analysis to form a modified timing window for said cell, wherein said selecting and said timing analysis are performed iteratively in a set of iterations until a desired convergence level is obtained.

4. The non-transitory computer readable medium of claim 3, wherein an output of said cell is coupled to an input of a subsequent cell, wherein both of said cell and said subsequent cell being present in a same timing path to a clocked element, wherein the actions performed by said digital processing system further comprise:
- computing in said timing analysis, a modified timing window for said cell based on said maximum voltage and said minimum voltage for said cell;
- augmenting the first sub-interval and said second sub-interval of said subsequent cell based on said modified timing window of said cell in a same iteration.

5. The non-transitory computer readable medium of claim 4, wherein said modified timing window has a duration longer than said timing window of said cell, wherein said duration is determined based on said maximum voltage and said minimum voltage,
- wherein said augmenting adds a time interval equal to said duration.

6. The non-transitory computer readable medium of claim 5, wherein said cell is the nth cell in said timing path, wherein n is an integer, and said duration for the nth cell equaling:

$$T\text{shift-cumulative}(n) = T\text{shift-cumulative}(n-1) + Vtd * \Delta V(n-1),$$

Wherein, $$T\text{shift-cumulative}(0) = 0,$$

Tshift-cumulative(n−1) is the values of said duration for the (n−1)th cell in said timing path,
Vtd is a scaling factor representing a ratio of a change in signal delay for a corresponding change in supply voltage, and
$\Delta V(n-1)$ represents a normalized voltage change for the (n−1)th cell, and equals ((Vnominal−Vmin)/Vnominal), wherein Vnominal represents a nominal power supply voltage.

7. The non-transitory computer readable medium of claim 3, further comprising:
- performing an voltage/IR drop analysis to generate voltage values available at each of said cells in corresponding timing windows,
- wherein said modified timing window is provided to said voltage/IR drop analysis to generate a new set of voltage values available at cells in said modified timing windows,
- wherein said maximum voltage and said minimum voltage are selected based on said new set of voltage values,
- whereby said voltage/IR drop analysis is included in each of said set of iterations.

* * * * *